(12) United States Patent
Shida

(10) Patent No.: US 8,483,928 B2
(45) Date of Patent: Jul. 9, 2013

(54) FOLLOW-UP RUN CONTROL DEVICE

(75) Inventor: Mitsuhisa Shida, Fuji (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/999,458

(22) PCT Filed: Mar. 4, 2009

(86) PCT No.: PCT/JP2009/054042
§ 371 (c)(1),
(2), (4) Date: Dec. 16, 2010

(87) PCT Pub. No.: WO2010/100725
PCT Pub. Date: Sep. 10, 2010

(65) Prior Publication Data
US 2011/0106391 A1    May 5, 2011

(51) Int. Cl.
*B60W 30/16*    (2012.01)
*B60W 30/165*   (2012.01)
*G08G 1/16*     (2006.01)
*G08G 1/00*     (2006.01)

(52) U.S. Cl.
CPC .......... *B60W 30/162* (2013.01); *B60W 30/165* (2013.01); *G08G 1/161* (2013.01); *G08G 1/22* (2013.01)
USPC .......................................................... 701/96

(58) Field of Classification Search
CPC ...... B60W 30/16; B60W 30/165; G08G 1/161; G08G 1/22
USPC .................................. 701/96, 117

IPC ............... G08G 1/00,1/09; B60W 30/16, 30/00
See application file for complete search history.

(56) References Cited

U.S. PATENT DOCUMENTS

| 5,777,451 A | 7/1998 | Kobayashi et al. |
| 6,032,097 A | 2/2000 | Iihoshi et al. |
| 6,401,024 B1 * | 6/2002 | Tange et al. ................... 701/96 |

(Continued)

FOREIGN PATENT DOCUMENTS

| JP | A-8-55300 | 2/1996 |
| JP | A-9-245299 | 9/1997 |

(Continued)

OTHER PUBLICATIONS

MacArthur et al. "Compliant Formation Control of a Multi-Vehicle System", International Symposium on Computational Intelligence in Robotics and Automation (CIRA 2007), Jun. 2007, pp. 479-484.*

(Continued)

Primary Examiner — James Trammell
Assistant Examiner — Todd Melton
(74) Attorney, Agent, or Firm — Oliff & Berridge, PLC

(57) ABSTRACT

A follow-up run control device controlling a running state of a vehicle in a state where peripheral vehicles running before or behind the vehicle exist includes: deviation acquiring means for acquiring information regarding a deviation between a relative positional relation and a target relative positional relation of the vehicle and the peripheral vehicles with respect to preceding vehicles running just before; and follow-up control amount calculating means for calculating a follow-up control amount of the vehicle to control the running state of the vehicle on the basis of the information regarding the deviations of a plurality of vehicles acquired by the deviation acquiring means.

4 Claims, 12 Drawing Sheets

U.S. PATENT DOCUMENTS

| | | | |
|---|---|---|---|
| 6,473,686 | B2 * | 10/2002 | Adachi et al. .................. 701/96 |
| 6,870,468 | B2 * | 3/2005 | Sugano ........................ 340/435 |
| 2003/0218564 | A1 | 11/2003 | Tamatsu et al. |
| 2007/0213914 | A1 * | 9/2007 | Etori et al. ..................... 701/96 |
| 2007/0233337 | A1 * | 10/2007 | Plishner ......................... 701/23 |

FOREIGN PATENT DOCUMENTS

| | | |
|---|---|---|
| JP | A-10-162282 | 6/1998 |
| JP | A-2001-199257 | 7/2001 |
| JP | A-2002-104015 | 4/2002 |
| JP | A-2003-344534 | 12/2003 |
| JP | A-2004-268644 | 9/2004 |
| JP | A-2007-69797 | 3/2007 |
| JP | A-2007-102564 | 4/2007 |

OTHER PUBLICATIONS

Davis. "Effect of Cooperative Merging on the Synchronous Flow Phase of Traffic", Physica A: Statistical Mechanics and its Applications 361(2), Mar. 2006, pp. 606-618.*

Seiler et al. "Disturbance Propagation in Vehicle Strings", IEEE Transactions on Automatic Control 49(10), Oct. 2004, pp. 1835-1841.*

Rajamani et al. "Design and Experimental Implementation of Longitudinal Control for a Platoon of Automated Vehicles", Journal of Dynamic Systems, Measurement, and Control 122(3), Sep. 2000, pp. 470-476.*

Yi et al. "Impedance Control for a Vehicle Platoon System", Mechatronics 15(5), Jun. 2005, pp. 627-638.*

Gulec et al. "A Novel Coordination Scheme Applied to Nonholonomic Mobile Robots", 44th IEEE Conference on Decision and Control 2005 and 2005 European Control Conference (CDC-ECC '05), Dec. 2005, pp. 5089-5094.*

Tampere et al. "Exploration of the Impact of Intelligent Speed Adaptation and Co-operative Following and Merging on Highways Using MIXIC", TNO Inro, Dec. 1999, pp. 3-9.*

International Search Report for International Patent Application No. PCT/JP2009/054042, mailed on Jun. 16, 2009.

* cited by examiner

FOLLOW-UP RUN CONTROL DEVICE

TECHNICAL FIELD

The present invention relates to a follow-up run control device controlling a running state of a vehicle in a state where peripheral vehicles running before or behind the vehicle exist.

BACKGROUND ART

Recently, to reduce a driver's burden in driving a vehicle, a technique of controlling a running state of a vehicle on the basis of a running state of a preceding vehicle has attracted attention. A driving support system described in Patent Literature 1 is known as such a follow-up run control technique. In such a system, inter-vehicle control is carried out by considering a preceding vehicle of a vehicle and a pre-preceding vehicle as a temporary preceding vehicle and selecting one larger in target deceleration or one smaller in target acceleration out of the preceding vehicle and the pre-preceding vehicle as a tracking target.

CITATION LIST

Patent Literature

Patent Literature 1: Japanese Unexamined Patent Application Publication No. 2002-104015

SUMMARY OF INVENTION

Technical Problem

However, in this driving support system, since control following only the running state of one vehicle selected out of the preceding vehicle and the pre-preceding vehicle is carried out, the running state of the other vehicle is not considered. That is, the driving support system could not carry out follow-up run control of a vehicle in consideration of the running states of plural peripheral vehicles around the vehicle.

Therefore, a goal of the invention is to provide a follow-up run control device which can carry out follow-up run control in consideration of the movements of plural vehicles around a vehicle.

Solution to Problem

According to an aspect of the invention, there is provided a follow-up run control device controlling a running state of a vehicle in a state where peripheral vehicles running before or behind the vehicle exist, including: deviation acquiring means for acquiring information regarding a deviation between a relative positional relation and a target relative positional relation of the vehicle and the peripheral vehicles with respect to preceding vehicles running just before; and follow-up control amount calculating means for calculating a follow-up control amount of the vehicle to control the running state of the vehicle on the basis of the information regarding the deviations of a plurality of vehicles acquired by the deviation acquiring means.

According to this follow-up run control device, the information regarding the deviations of the peripheral vehicles is acquired in addition to the information regarding the deviation of the vehicle and the follow-up control amount of the vehicle is calculated on the basis of the acquired information regarding the deviations of the plural vehicles. Accordingly, the follow-up control amount is calculated in consideration of the movements of the preceding vehicles of the peripheral vehicles in addition to the movement of the preceding vehicle of the vehicle, whereby it is possible to carry out the follow-up run control of the vehicle in consideration of the running states of the plural peripheral vehicles.

Specifically, when m (where m=2, 3, . . . ) peripheral vehicles exist, the follow-up control amount u of the vehicle calculated by the follow-up control amount calculating means may be expressed by the following expression, $$u = k_1 D_1 + c_1 D_1' + k_2(D_1 + D_2) + c_2(D_1' + D_2') + \ldots + k_m(D_1 + D_2 + \ldots + D_m) + c_m(D_1' + D_2' + \ldots + D_m')$$

where $D_1$ represents the deviation between the relative positional relation and the target relative positional relation of the vehicle with respect to the preceding vehicle thereof, $D_1'$ represents the temporal differentiation of the deviation $D_1$, $D_n$ represents the deviation between the relative positional relation and the target relative positional relation of the (n−1)-th peripheral vehicle before the vehicle with respect to the preceding vehicle thereof, $D_n'$, represents the temporal differentiation of the deviation $D_n$, and $k_1$ to $k_m$ and $c_1$ to $c_m$ are constants.

The follow-up control amount u of the vehicle is calculated by the follow-up control amount calculating means while specifically considering the movements of the plural peripheral vehicles.

The deviation acquiring means may acquire the information regarding the deviations of the peripheral vehicles by inter-vehicle communications with the corresponding peripheral vehicles, and the follow-up control amount calculating means may calculate the follow-up control amount of the vehicle and the follow-up control amounts of the peripheral vehicles on the basis of the information regarding the deviations of a plurality of vehicles acquired by the deviation acquiring means.

According to this configuration, the vehicle can easily acquire the information regarding the deviations of the peripheral vehicles by the inter-vehicle communication and can carry out the run control in cooperation with the vehicle and the peripheral vehicles by calculating the follow-up control amount of the vehicle and the follow-up control amount of the peripheral vehicles.

The follow-up run control device may further include vehicle lane probability acquiring means for acquiring a vehicle lane probability representing the likelihood that one peripheral vehicle exists in the same lane as the vehicle, and the follow-up control amount calculating means may calculate the follow-up control amount of the vehicle additionally on the basis of the vehicle lane probabilities of the peripheral vehicles.

According to this configuration, when it is assumed that a peripheral vehicle slowly cuts in the vehicle lane, the vehicle lane probability of the corresponding peripheral vehicle slowly increases. Since the follow-up run control device of the vehicle calculates the follow-up control amount of the vehicle while also considering the vehicle lane probability of the corresponding peripheral vehicle, it is possible to smoothly enhance the influence of the peripheral vehicle on the follow-up control amount of the vehicle. Accordingly, it is possible to prevent discontinuous run control of the vehicle due to the cutting-in of the peripheral vehicle.

Advantageous Effects of Invention

In the follow-up run control device according to the invention, it is possible to carry out a follow-up run in consideration of the movements of plural vehicles around a vehicle.

REFERENCE SIGNS LIST

1, 201, 301, 401, 501: FOLLOW-UP RUN CONTROL DEVICE
10: VEHICLE CONTROL ECU (DEVIATION ACQUIRING MEANS, FOLLOW-UP CONTROL AMOUNT CALCULATING MEANS, VEHICLE LANE PROBABILITY ACQUIRING MEANS)
26: WIRELESS CONTROL ECU (INTER-VEHICLE COMMUNICATION MEANS)
26*a*: WIRELESS ANTENNA (INTER-VEHICLE COMMUNICATION MEANS)
$L_{1r}, L_1, L_2, L_3$: INFER-VEHICLE DISTANCE (RELATIVE POSITIONAL RELATION)
$L_{tgt\_1r}, L_{tgt\_1}, L_{tgt\_2}, L_{tgt\_3}$: TARGET INTER-VEHICLE DISTANCE (TARGET RELATIVE POSITIONAL RELATION)
$D_{1r}, D_1, D_2, D_3$: INTER-VEHICLE ERROR (DEVIATION)
$D_{1r}', D_1', D_2', D_3'$: RELATIVE SPEED
$M_0$: VEHICLE
$M_{1r}, M_1, M_2, M_3$: PERIPHERAL VEHICLE

DESCRIPTION OF EMBODIMENTS

Hereinafter, a follow-up run control device according to exemplary embodiments of the invention will be described in detail with reference to the accompanying drawings.

First Embodiment

Figure 1:
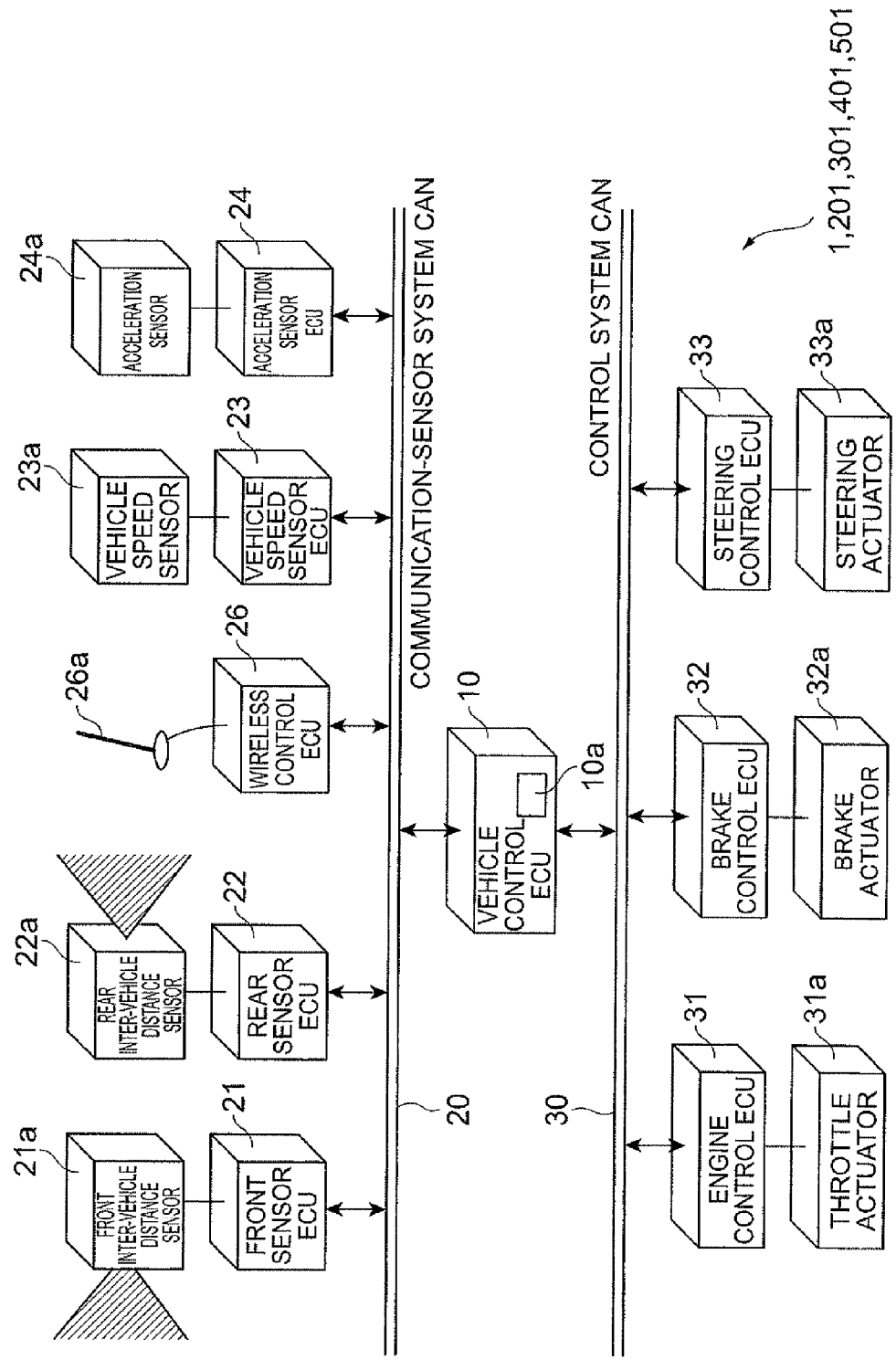
FIG. 1 is a block diagram illustrating a follow-up run control device according to first to fifth embodiments of the invention.
Figure 2:
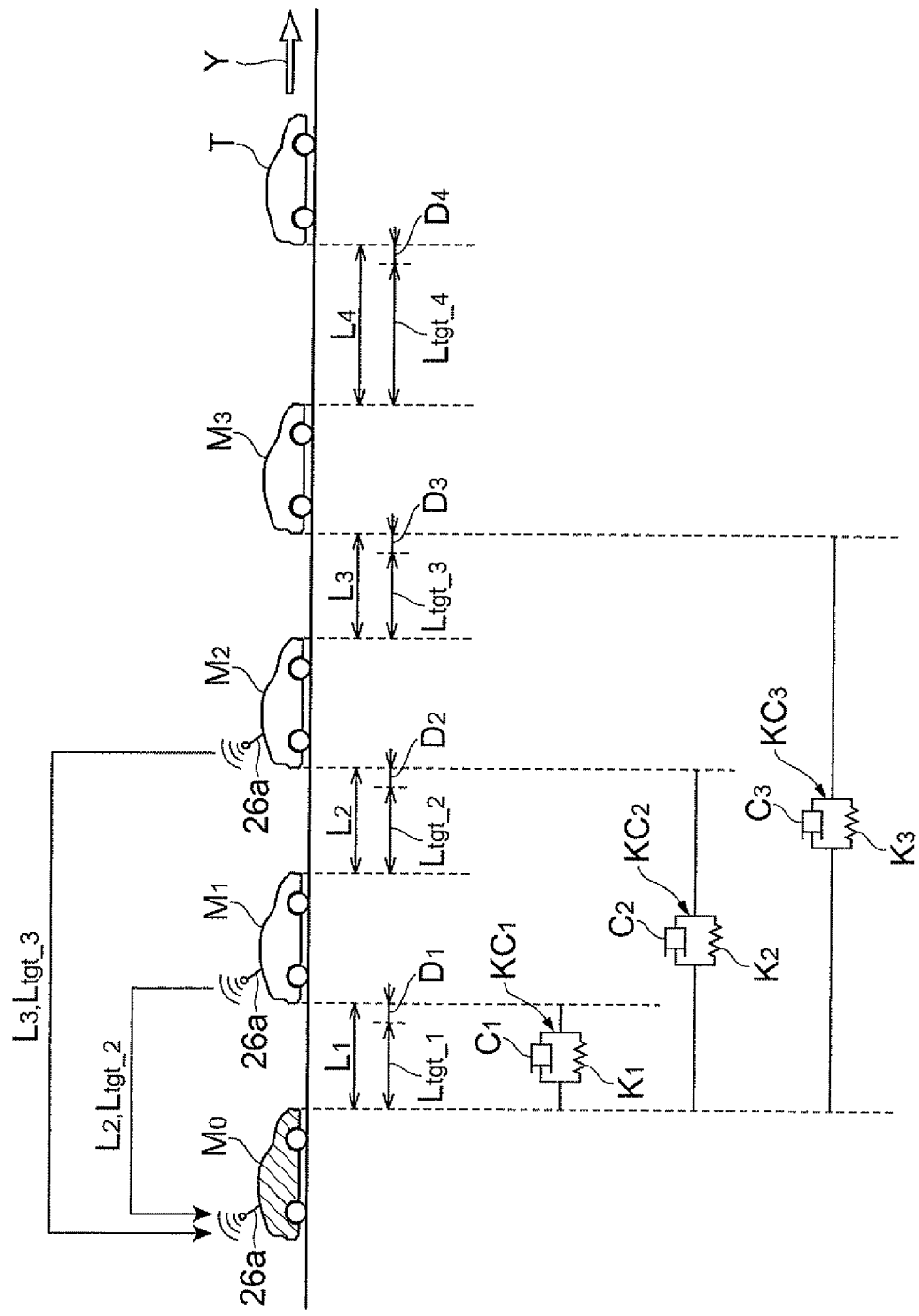
FIG. 2 is a diagram illustrating run control carried out by the follow-up run control device according to the first embodiment.

A follow-up run control device according to a first embodiment of the invention will be described. The follow-up run control device 1 shown in FIG. 1 is a system that is mounted on a vehicle $M_0$ shown in FIG. 2 and that carries out a follow-up run of the vehicle $M_0$ so as to correspond to running states of peripheral vehicles running around the vehicle $M_0$. The follow-up run control device 1 can carry out the follow-up run when plural peripheral vehicles exist, and it is assumed herein that three peripheral vehicles are running before the vehicle $M_0$, as shown in FIG. 2.

In the following description, the first peripheral vehicle running before the vehicle $M_0$ is represented by "$M_1$", the second peripheral vehicle is represented by "$M_2$", and the third peripheral vehicle is represented by "$M_3$". A vehicle T is shown before the peripheral vehicle $M_3$ in FIG. 2. Although the details will be described later, as the running state of the vehicle T does not have any influence on the run control of the vehicle $M_0$, the vehicle T is not referred to as a "peripheral vehicle". That is, only when the running state of a vehicle has an influence on the run control of the vehicle $M_0$ is the vehicle referred to as a "peripheral vehicle" and represented by a reference sign "$M_x$". It is assumed that all of the vehicle $M_0$, the peripheral vehicles $M_1$ to $M_3$, and the vehicle T travel in the same lane in the direction of arrow Y.

In the vehicle $M_0$, an inter-vehicle distance from a preceding vehicle (which is the peripheral vehicle $M_1$ in this case) running just before is represented by "$L_1$", a target inter-vehicle distance from the preceding vehicle is represented by "$L_{tgt\_1}$", and an error between the inter-vehicle distance $L_1$ and the target inter-vehicle distance $L_{tgt\_1}$ is represented by "$D_1$". In the peripheral vehicle $M_{n-1}$, an inter-vehicle distance from a preceding vehicle (which is the peripheral vehicle $M_n$ in this case) is represented by "$L_n$", a target inter-vehicle distance from the preceding vehicle is represented by "$L_{tgt\_n}$", and an error between the inter-vehicle distance $L_n$ and the target inter-vehicle distance $L_{tgt\_1}$, is represented by "$D_n$" (where n=2, 3, 4).

As described above, the vehicle $M_0$ is mounted with the follow-up run control device 1 described below.

As shown in FIG. 1, the follow-up run control device 1 includes a vehicle control ECU (Electronic Control Unit) 10. The vehicle control ECU 10 is an electronic control unit which controls the follow-up run control device 1 as a whole and is mainly constructed, for example, by a computer including a CPU, a ROM, and a RAM. The vehicle control ECU 10 includes an information storage unit 10*a* storing information temporarily or long term.

The follow-up run control device 1 includes sensors sensing the running state of the vehicle. The sensors include a front inter-vehicle distance sensor 21*a*, a rear inter-vehicle distance sensor 22*a*, a vehicle speed sensor 23*a*, and an acceleration sensor 24*a*.

The front inter-vehicle distance sensor 21*a* senses the inter-vehicle distance from a preceding vehicle running just before the vehicle. Similarly, the rear inter-vehicle distance sensor 22*a* senses the inter-vehicle distance from a vehicle running just behind the vehicle. The front inter-vehicle distance sensor 21*a* and the rear inter-vehicle distance sensor 22*a* employ millimeter wave radars disposed in the front portion and the rear portion of the vehicle, respectively. The signal acquired from the front inter-vehicle distance sensor 21a is processed by a front sensor ECU 21 and is transmitted as front inter-vehicle distance information to the vehicle control ECU 10. Similarly, the signal acquired from the rear inter-vehicle distance sensor 22a is processed by a rear sensor ECU 22 and is transmitted as rear inter-vehicle distance information to the vehicle control ECU 10.

The front inter-vehicle distance sensor 21a can sense the distances from plural vehicles including a vehicle preceding the preceding vehicle in addition to the distance from the preceding vehicle running just before the vehicle. Similarly, the rear inter-vehicle distance sensor 22a can sense the distances from plural vehicles including a vehicle behind the following vehicle in addition to the distance from the following vehicle running just behind the vehicle.

The vehicle speed sensor 23a senses the speed of the vehicle. For example, an electromagnetic pickup sensor sensing a wheel speed is used as the vehicle speed sensor 23a. The signal acquired by the vehicle speed sensor 23a is processed by a vehicle speed sensor ECU 23 and is transmitted as vehicle speed information to the vehicle control ECU 10. For example, a gas rate sensor or gyro sensor is used as an acceleration sensor 24a. The signal acquired by the acceleration sensor 24a is processed by an acceleration sensor ECU 24 and is transmitted as acceleration information to the vehicle control ECU 10.

The front sensor ECU 21, the rear sensor ECU 22, the vehicle speed sensor ECU 23, and the acceleration sensor ECU 24 are connected to the vehicle control ECU 10 through a communication-sensor system CAN 20 constructed as an intra-vehicle network.

As described above, the follow-up run control device 1 can acquire the front inter-vehicle distance information, the rear inter-vehicle distance information, the vehicle speed information, and the acceleration information of the vehicle by the use of the above-mentioned sensors. In the below description, the front inter-vehicle distance information, the rear inter-vehicle distance information, the vehicle speed information, and the acceleration information may also be referred to as "running state information" as a whole.

The follow-up run control device 1 includes an engine control ECU 31, a brake control ECU 32, and a steering control ECU 33 which perform operations of acceleration, deceleration, and steering of the vehicle. The engine control ECU 31 receives instructed acceleration value information transmitted from the vehicle control ECU 10 and operates a throttle actuator 31a by an amount of operation corresponding to the instructed acceleration value. The brake control ECU 32 receives the instructed acceleration value information and operates a brake actuator 32a by an amount of operation corresponding to the instructed acceleration value. The steering control ECU 33 receives instructed steering value information transmitted from the vehicle control ECU 10 and operates a steering actuator 33a by an amount of operation corresponding to the instructed steering value.

The follow-up run control device 1 includes a wireless antenna 26a and a wireless control ECU 26 so as to exchange the running state information with another vehicle. The vehicles including the wireless antenna 26a and the wireless control ECU 26 can carry out inter-vehicle communications with each other by the use of the wireless antenna 26a and the wireless control ECU 26 to acquire the vehicle specification information, the running state information, the instructed acceleration value information, and other information of the other vehicles and to transmit the vehicle specification information, the running state information, the instructed acceleration value information, and other information of the vehicle. By this inter-vehicle communication, the vehicle control ECUs 10 of all the vehicles involved in the inter-vehicle communication can share a variety of information of all the vehicles. The wireless control ECU 26 is connected to the vehicle control ECU 10 through the communication-sensor system CAN 20.

A vehicle including the wireless antenna 26a and the wireless control ECU 26 to perform the inter-vehicle communication with the vehicle $M_0$ exists among the peripheral vehicles $M_1$, $M_2$, . . . . In this way, a vehicle performing the inter-vehicle communication with the vehicle $M_0$ is referred to as the "communicating vehicle" in the below description and a vehicle not performing the inter-vehicle communication with the vehicle $M_0$ is referred to as the "non-communicating vehicle".

Here, the peripheral vehicle $M_1$ is a communicating vehicle performing the inter-vehicle communication with the vehicle $M_0$ and controls the front inter-vehicle distance $L_2$ by setting the target inter-vehicle distance (target relative positional relation) $L_{tgt\_2}$ and measuring the front inter-vehicle distance (relative positional relation) $L_2$ by the use of the front inter-vehicle distance sensor. The peripheral vehicle $M_1$ calculates the relative speed $dL_2/dt$ to the peripheral vehicle $M_2$ as a temporal differentiation of the front inter-vehicle distance $L_2$. The target inter-vehicle distance $L_{tgt\_2}$, the front inter-vehicle distance $L_2$, and the relative speed $dL_2/dt$ can be transmitted to the vehicle $M_0$ by the inter-vehicle communication.

Similarly, the peripheral vehicle $M_2$ is a communicating vehicle and controls the front inter-vehicle distance $L_3$ by setting the target inter-vehicle distance $L_{tgt\_3}$ and measuring the front inter-vehicle distance $L_3$ by the use of the front inter-vehicle distance sensor. The peripheral vehicle $M_2$ calculates the relative speed $dL_3/dt$ to the peripheral vehicle $M_3$ as a temporal differentiation of the front inter-vehicle distance $L_3$. The target inter-vehicle distance $L_{tgt\_3}$, the front inter-vehicle distance $L_3$, and the relative speed $dL_3/dt$ can be transmitted to the vehicle $M_0$ by the inter-vehicle communication.

On the other hand, the peripheral vehicle $M_3$ can set the target inter-vehicle distance $L_{tgt\_4}$ and control the front inter-vehicle distance $L_4$. However, since the peripheral vehicle $M_3$ is a non-communicating vehicle, the vehicle control ECU 10 of the vehicle $M_0$ cannot acquire the target inter-vehicle distance $L_{tgt\_4}$, the front inter-vehicle distance $L_4$, and the relative speed $dL_4/dt$ with respect to the vehicle T.

An example of the follow-up run control of the vehicle $M_0$ carried out by the follow-up run control device 1 will be described below with reference to FIGS. 2 and 3.

Figure 3:
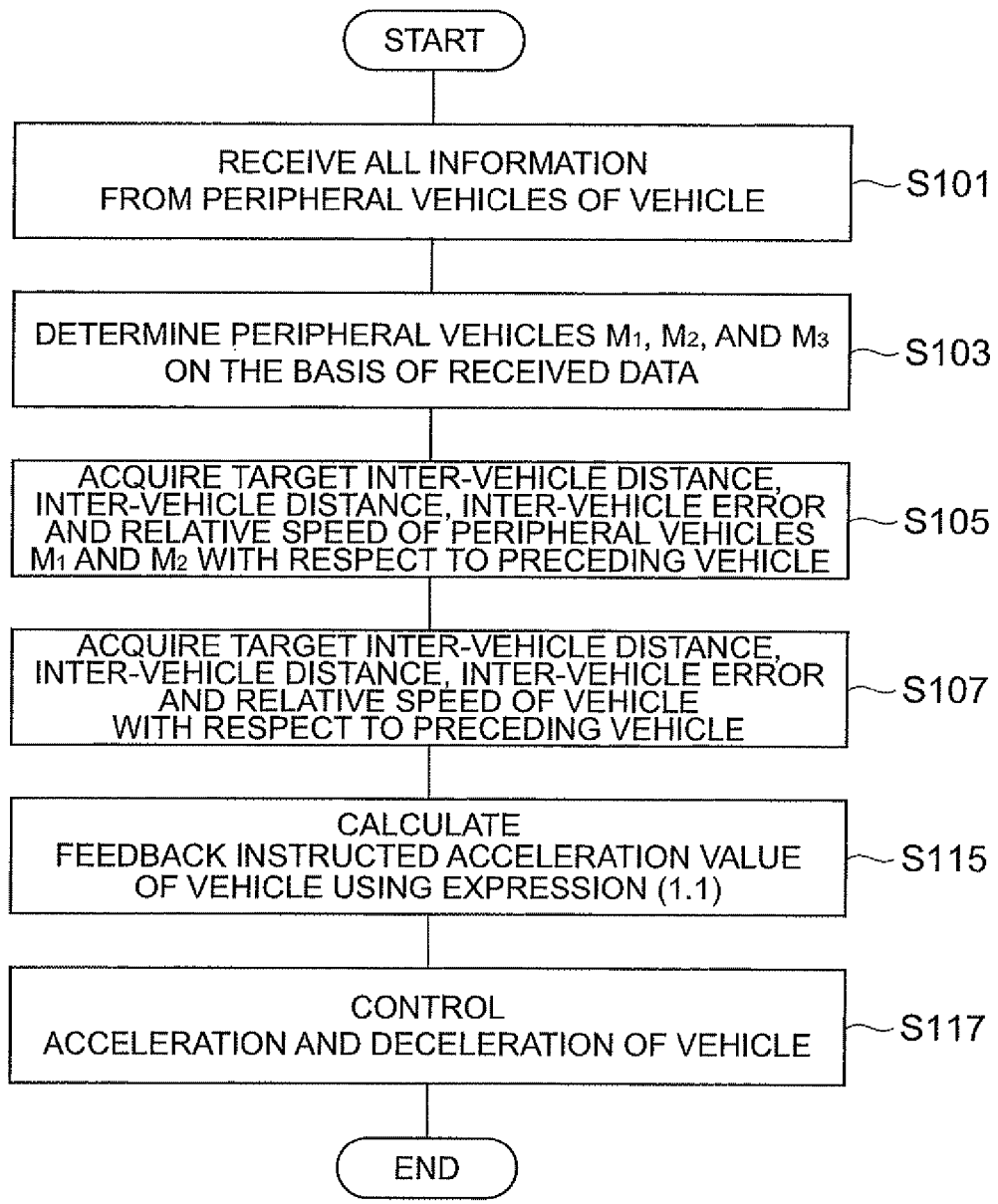
FIG. 3 is a flowchart illustrating the run control carried out by the follow-up run control device according to the first embodiment.

First, the vehicle control ECU 10 receives all the information from the peripheral vehicles around the vehicle by the inter-vehicle communication (S101 in FIG. 3). For example, the vehicle IDs of the vehicles, the front inter-vehicle distance, the relative speed to a preceding vehicle, the speed, the acceleration, and the position are received by the inter-vehicle communication.

Then, the vehicle control ECU 10 determines the peripheral vehicles having an influence on the run control of the vehicle $M_0$ on the basis of the received data acquired by the inter-vehicle communication (S103). That is, for example, vehicles running in the same lane as the vehicle $M_0$ are extracted on the basis of the receive data. Here, since the vehicles including the vehicle $M_3$ before the vehicle (vehicle $M_2$) running in the forefront among the communicating vehicles in the same lane have an influence on the run control of the vehicle $M_0$, the vehicles $M_1$, $M_2$, and $M_3$ are determined as the peripheral vehicles.

Then, the vehicle control ECU 10 acquires the target inter-vehicle distance $L_{tgt\_2}$, the inter-vehicle distance $L_2$, the inter-vehicle error $D_2$, and the relative speed $dL_2/dt$ of the peripheral vehicle $M_1$ with respect to the preceding vehicle (peripheral vehicle $M_2$) running just before. Similarly, the vehicle control ECU 10 acquires the target inter-vehicle distance $L_{tgt\_3}$, the inter-vehicle distance $L_3$, the inter-vehicle error $D_3$, and the relative speed $dL_3/dt$ of the peripheral vehicle $M_2$ with respect to the preceding vehicle (peripheral vehicle $M_3$) running just before (S105).

Specifically, the vehicle control ECU 10 acquires the target inter-vehicle distance $L_{tgt\_2}$, the front inter-vehicle distance $L_2$, and the relative speed $dL_2/dt$ of the peripheral vehicle $M_1$ with respect to the peripheral vehicle $M_2$ by the inter-vehicle communication with the peripheral vehicle $M_1$. Then, the vehicle control ECU calculates the inter-vehicle error $D_2$ from the difference between the target inter-vehicle distance $L_{tgt\_2}$ and the front inter-vehicle distance $L_2$.

Similarly, the vehicle control ECU 10 acquires the target inter-vehicle distance $L_{tgt\_3}$, the front inter-vehicle distance $L_3$, and the relative speed $dL_3/dt$ of the peripheral vehicle $M_2$ with respect to the peripheral vehicle $M_3$ by the inter-vehicle communication with the peripheral vehicle $M_2$. Then, the vehicle control ECU calculates the inter-vehicle error $D_3$ from the difference between the target inter-vehicle distance $L_{tgt\_3}$ and the front inter-vehicle distance $L_3$. Since the peripheral vehicle $M_3$ located in the foremost is a non-communicating vehicle, the information regarding the relation of the peripheral vehicle $M_3$ with the preceding vehicle cannot be acquired by the inter-vehicle communication.

The method of allowing the vehicle control ECU 10 to acquire the front inter-vehicle distances $L_2$ and $L_3$ is not limited to the inter-vehicle communication between the peripheral vehicles $M_1$ and $M_2$, but the inter-vehicle distances $L_2$ and $L_3$ may be acquired on the basis of the distance to the peripheral vehicle $M_2$ or the distance to the peripheral vehicle $M_3$ measured by the front inter-vehicle distance sensor 21a of the vehicle $M_0$. According to this method, it is possible to acquire the inter-vehicle distance $L_4$ which could not be acquired by the inter-vehicle communication. By calculating differences in current position between the vehicles $M_0$, $M_1$, $M_2$, and $M_3$, the inter-vehicle distances $L_1$, $L_2$, and $L_3$ may be acquired.

The vehicle control ECU 10 acquires the target inter-vehicle distance $L_{tgt\_1}$, from the peripheral vehicle $M_1$ as a preceding vehicle, the inter-vehicle distance $L_1$ (front inter-vehicle distance), the inter-vehicle error $D_1$, and the relative speed $dL_1/dt$ with respect to the preceding vehicle in the vehicle $M_0$ (S107). Specifically, the vehicle control ECU 10 sets the target inter-vehicle distance $L_{tgt\_1}$ as a target of the front inter-vehicle distance of the vehicle $M_0$ and acquires the actual front inter-vehicle distance $L_1$ by the use of the front inter-vehicle distance sensor 21a. The vehicle control ECU 10 calculates the inter-vehicle error $D_1$ from the difference between the target inter-vehicle distance $L_{tgt\_1}$ and the front inter-vehicle distance $L_1$. The vehicle control ECU 10 calculates the relative speed $dL_1/dt$ to the peripheral vehicle $M_1$ as a temporal differentiation of the front inter-vehicle distance $L_1$.

The relative speeds $dL_1/dt$, $dL_2/dt$, and $dL_3/dt$ can be considered as the temporal differentiations of the inter-vehicle errors $D_1$, $D_2$, and $D_3$, and are thus expressed as the relative speeds $D_1'$, $D_2'$, and $D_3'$ in the following description. The vehicle control ECU 10 may acquire the relative speeds $D_1'$, $D_2'$, and $D_3'$ by calculating the temporal differentiations of the acquired inter-vehicle errors $D_1$, $D_2$, and $D_3$. As described above, the vehicle control ECU 10 can acquire the inter-vehicle errors $D_1$, $D_2$, and $D_3$ and the relative speeds $D_1'$, $D_2'$, and $D_3'$ through the processes of steps S105 and S107, and the vehicle control ECU 10 serves as the deviation acquiring means.

The vehicle control ECU 10 calculates a feedback instructed acceleration value $u_{fb}$ of the vehicle $M_0$ using Expression (1.1) (S115). Here, the vehicle control ECU 10 serves as the follow-up control amount calculating means.

$$u_{fb} = k_1 D_1 + c_1 D_1' + k_2(D_1 + D_2) + c_2(D_1' + D_2') + \\ k_3(D_1 + D_2 + D_3) + c_3(D_1' + D_2' + D_3') \quad \text{Expression (1.1)}$$

Here, $k_1$ to $k_3$ and $c_1$ to $c_3$ in Expression (1.1) are constants and the values thereof are determined in advance on the basis of a design idea desired by a designer of the follow-up run control device 1 and stored in advance in the information storage unit 10a of the vehicle control ECU 10.

The vehicle control ECU 10 carries out the acceleration and deceleration control of the vehicle $M_0$ by transmitting the calculated feedback instructed acceleration value $u_{fb}$ to the engine control ECU 31 and the brake control ECU 32 (S117). By repeatedly performing the processes of steps S101 to S117 in the course of running, the follow-up run control of the vehicle $M_0$ based on the running states of the peripheral vehicles $M_1$ to $M_3$ is carried out.

Here, the meaning of Expression (1.1) will be reviewed. As shown in FIG. 2, the acceleration and deceleration of the vehicle $M_0$ is controlled on the basis of a control model in which a spring damper unit $KC_1$ is connected between the vehicle $M_0$ and the peripheral vehicle $M_1$, a spring damper unit $KC_2$ is connected between the vehicle $M_0$ and the peripheral vehicle $M_2$, and a spring damper unit $KC_3$ is connected between the vehicle $M_0$ and the peripheral vehicle $M_3$. Here, the spring damper unit $KC_1$ includes a spring $K_1$ with a spring constant $k_1$ and a damper $C_1$ with a damping coefficient $c_1$ connected in parallel, the spring damper unit $KC_2$ includes a spring $K_2$ with a spring constant $k_2$ and a damper $C_2$ with a damping coefficient $c_2$ connected in parallel, and the spring damper unit $KC_3$ includes a spring $K_3$ with a spring constant $k_3$ and a damper $C_3$ with a damping coefficient $c_3$ connected in parallel.

Therefore, according to the follow-up run control device 1, it is possible to carry out the follow-up run in consideration of the movements of three peripheral vehicles $M_1$, $M_2$, and $M_3$ existing around the vehicle $M_0$.

For example, when the vehicle T is suddenly decelerated and the peripheral vehicle $M_3$ is later decelerated, the vehicle $M_0$ can rapidly start its deceleration due to the operation of the spring damper unit $KC_3$ before the deceleration of the peripheral vehicle $M_3$ is transmitted to the peripheral vehicle $M_2$. In this way, since the vehicle $M_0$ can rapidly move in response to the movements of the group of the preceding peripheral vehicles $M_1$, $M_2$, and $M_3$, it is possible to improve the driver's feeling of security in addition to the stability of the follow-up run. At this time, since the deceleration is rapidly transmitted to the following vehicle of the vehicle $M_0$ through the brake lamp by the rapid braking of the vehicle $M_0$ and thus the delay in movement of the following vehicle is reduced, it is possible to reduce the bad influence on the total traffic flow.

Although it has been described in this embodiment that three peripheral vehicles exist, the similar control can be carried out even when any number of peripheral vehicles exist. That is, when m (where m=2, 3, . . . ) peripheral vehicles are set in front of the vehicle $M_0$, the inter-vehicle errors $D_1$, $D_2, \ldots,$ and $D_m$ and the relative speeds $D_1', D_2', \ldots,$ and $D_m'$ are acquired similarly to the above-mentioned method and the feedback instructed acceleration value $u_{fb}$ of the vehicle $M_0$ is calculated using Expression (1.2).

$$u_{fb} = k_1 D_1 + c_1 D_1' + k_2(D_1 + D_2) + c_2(D_1' + D_2') + \ldots + \\ k_m(D_1 + D_2 + \ldots + D_m) + c_m(D_1' + D_2' + \ldots + D_m') \quad \text{Expression (1.2)}$$

Second Embodiment

The follow-up run control device according to the second embodiment of the invention will be described. The physical configuration of the follow-up run control device 201 according to this embodiment mounted on the vehicle $M_0$ is the same as the follow-up run control device 1 as shown in FIG. 1 and thus repeated description thereof is not made.

Figure 4:
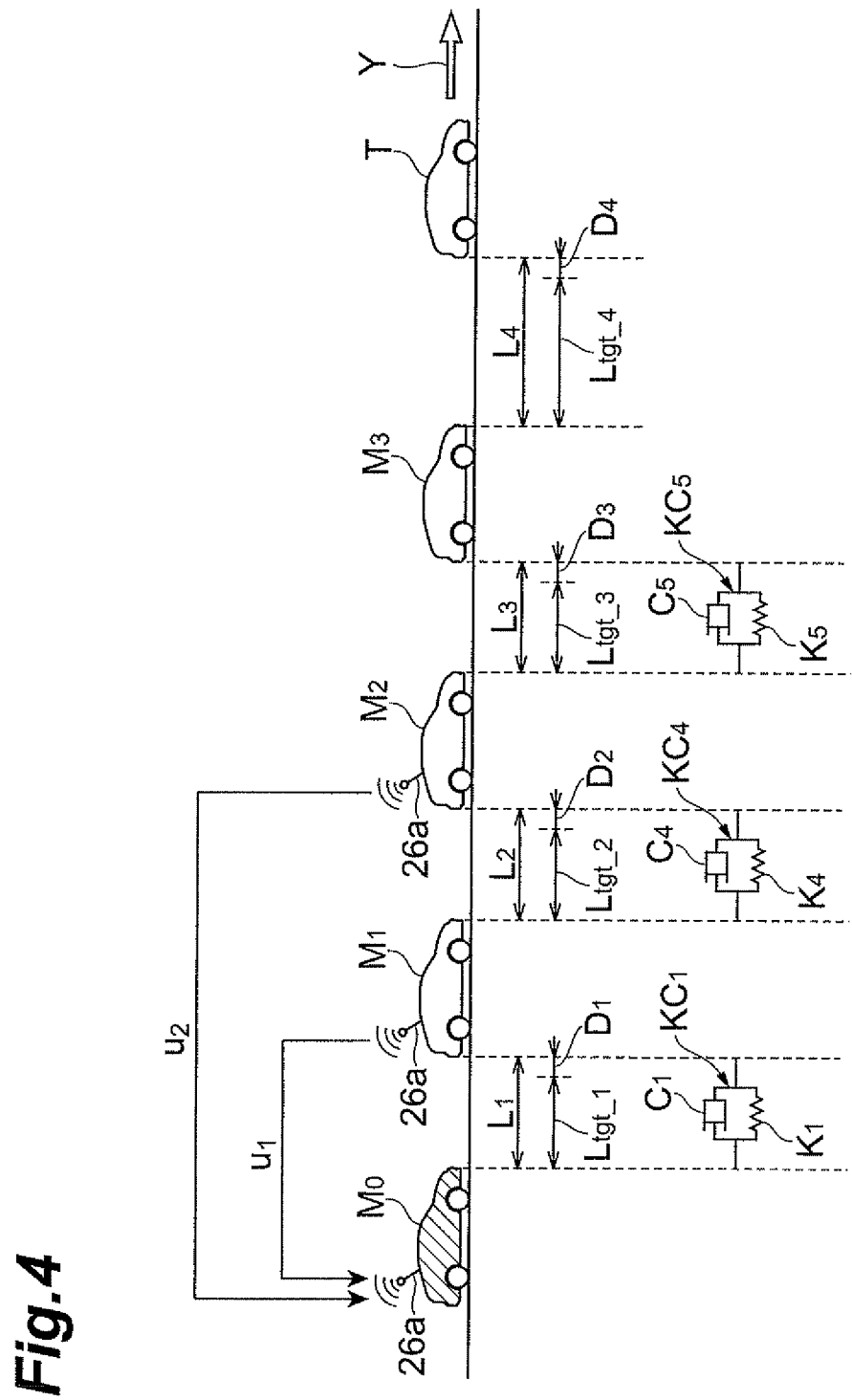
FIG. 4 is a diagram illustrating run control carried out by the follow-up run control device according to the second embodiment.

As shown in FIG. 4, it is assumed that the peripheral vehicle $M_1$ sets the peripheral vehicle $M_2$ which is the preceding vehicle as a follow-up target and controls the front inter-vehicle communication $L_2$ by self ACC (Adaptive Cruise Control). In this case, the target acceleration $u_1$ of the peripheral vehicle $M_1$ is expressed by Expression (2.1).

$$u_1 = k_4 D_2 + c_4 D_2' \quad \text{Expression (2.1)}$$

This expression is based on a control model in which the peripheral vehicle $M_1$ is connected to the peripheral vehicle $M_2$ through a spring damper unit $KC_4$ including a spring $K_4$ with a spring constant $k_4$ and a damper $C_4$ with a damping coefficient $c_4$, as shown in FIG. 4. The target acceleration $u_1$ is transmitted to the vehicle $M_0$ by the inter-vehicle communication.

Similarly, it is assumed that the peripheral vehicle $M_2$ sets the peripheral vehicle $M_3$ which is the preceding vehicle as a follow-up target and controls the front inter-vehicle communication $L_3$ by self ACC. In this case, the target acceleration $u_2$ of the peripheral vehicle $M_2$ is expressed by Expression (2.2).

$$u_2 = k_5 D_3 + c_5 D_3' \quad \text{Expression (2.2)}$$

This expression is based on a control model in which the peripheral vehicle $M_2$ is connected to the peripheral vehicle $M_3$ through a spring damper unit $KC_5$ including a spring $K_5$ with a spring constant $k_5$ and a damper $C_5$ with a damping coefficient $c_5$, as shown in FIG. 4. The target acceleration $u_2$ is transmitted to the vehicle $M_0$ by the inter-vehicle communication.

Figure 5:
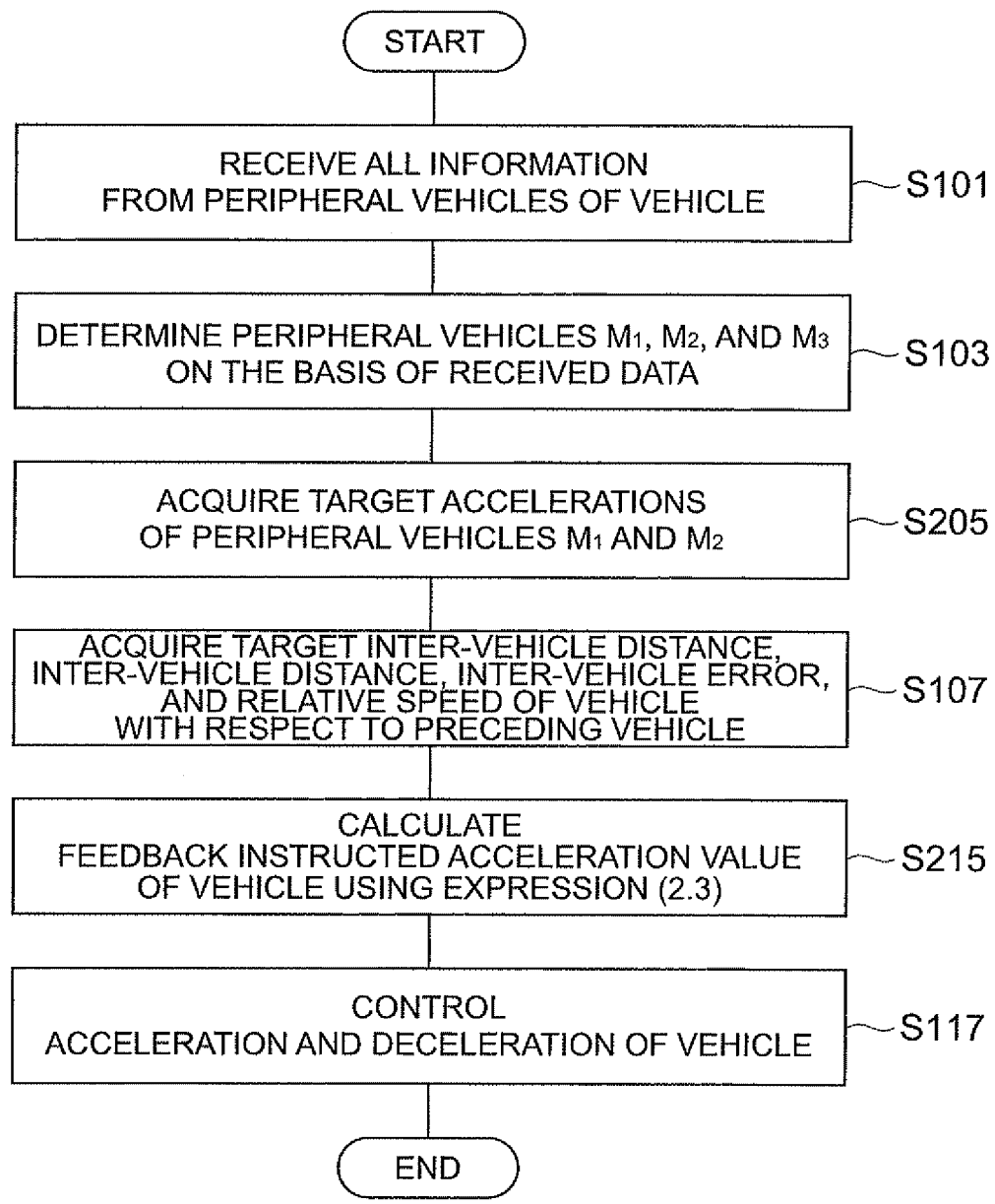
FIG. 5 is a flowchart illustrating the run control carried out by the follow-up run control device according to the second embodiment.

An example of the follow-up run control carried out by the follow-up run control device 201 will be described below with reference to FIGS. 4 and 5. In the flowchart of FIG. 5, the processes equal or equivalent to the processes shown in FIG. 3 are referenced by like reference signs and the repeated description thereof is not made.

After the vehicles $M_1$, $M_2$, and $M_3$ are determined as the peripheral vehicles through the processes of steps S101 and S103, the vehicle control ECU 10 acquires the target acceleration $u_1$ from the peripheral vehicle $M_1$ and acquires the target acceleration $u_2$ from the peripheral vehicle $M_2$ by the inter-vehicle communication (S205). The vehicle control ECU 10 acquires the inter-vehicle error $D_1$ and the relative speed $D_1'$ in the vehicle $M_0$ (S107).

Then, the vehicle control ECU 10 calculates the feedback instructed acceleration value $u_{fb}$ of the vehicle $M_0$ using Expression (2.3) obtained by adding the target accelerations $u_1$ and $u_2$ acquired from the peripheral vehicles $M_1$ and $M_2$ to the expression for controlling the front inter-vehicle distance $L_1$ of the vehicle $M_0$ in a feed-forward manner (S215).

$$u_{fb} = u_1 + u_2 + (k_1 D_1 + c_1 D_1') \quad \text{Expression (2.3)}$$

Then, the calculated feedback instructed acceleration value $u_{fb}$ is transmitted to the engine control ECU 31 and the brake control ECU 32 (S117).

Here, Expressions (2.1) and (2.2) are inserted into $u_1$ and $u_2$ in Expression (2.3) to obtain Expression (2.4).

$$u_{fb} = (k_4 D_2 + c_4 D_2') + (k_5 D_3 + c_5 D_3') + (k_1 D_1 + c_1 D_1') \quad \text{Expression (2.4)}$$

This expression can be changed and arranged into Expression (2.5) which has the form similar to Expression (1.1).

$$u_{fb} = \alpha_1 D_1 + \beta_1 D_1' + \alpha_2(D_1 + D_2) + \beta_2(D_1' + D_2') + \\ \alpha_3(D_1 + D_2 + D_3) + \beta_3(D_1' + D_2' + D_3') \quad \text{Expression (2.5)}$$

(where $\alpha_1$ to $\alpha_3$ are constants including $k_1$, $k_4$, and $k_5$ and $\beta_1$ to $\beta_3$ are constants including $c_1$, $c_4$, and $c_5$)

Therefore, according to the follow-up run control device 201, it is possible to carry out the follow-up run in consideration of the movements three peripheral vehicles $M_1$ to $M_3$ existing around the vehicle $M_0$, similarly to the follow-up run control device 1.

Since the target acceleration $u_1$ of Expression (2.1) includes the inter-vehicle error $D_2$ and the relative speed $D_2'$, the step (S205) of acquiring the target acceleration $u_1$ by the use of the vehicle control ECU 10 is substantially equal to the step of acquiring the information regarding the front inter-vehicle error $D_2$ of the peripheral vehicle $M_1$.

Similarly, since the target acceleration $u_2$ of Expression (2.2) includes the inter-vehicle error $D_3$ and the relative speed $D_3'$, the step (S205) of acquiring the target acceleration $u_2$ by the use of the vehicle control ECU 10 is substantially equal to the step of acquiring the information regarding the front inter-vehicle error $D_3$ of the peripheral vehicle $M_2$. Therefore, the vehicle control ECU 10 acquiring the target accelerations $u_1$ and $u_2$ in the process of step S205 according to this embodiment serves as the deviation acquiring means acquiring the information regarding the deviation.

Third Embodiment

The follow-up run control device according to the third embodiment of the invention will be described. The physical configuration of the follow-up run control device 301 according to this embodiment mounted on the vehicle $M_0$ is the same as the follow-up run control device 1 as shown in FIG. 1 and thus repeated description thereof is not made.

The follow-up run control device 301 considers the running states of peripheral vehicles behind the vehicle $M_0$ in addition to the control method of the follow-up run control device 1.

Figure 6:
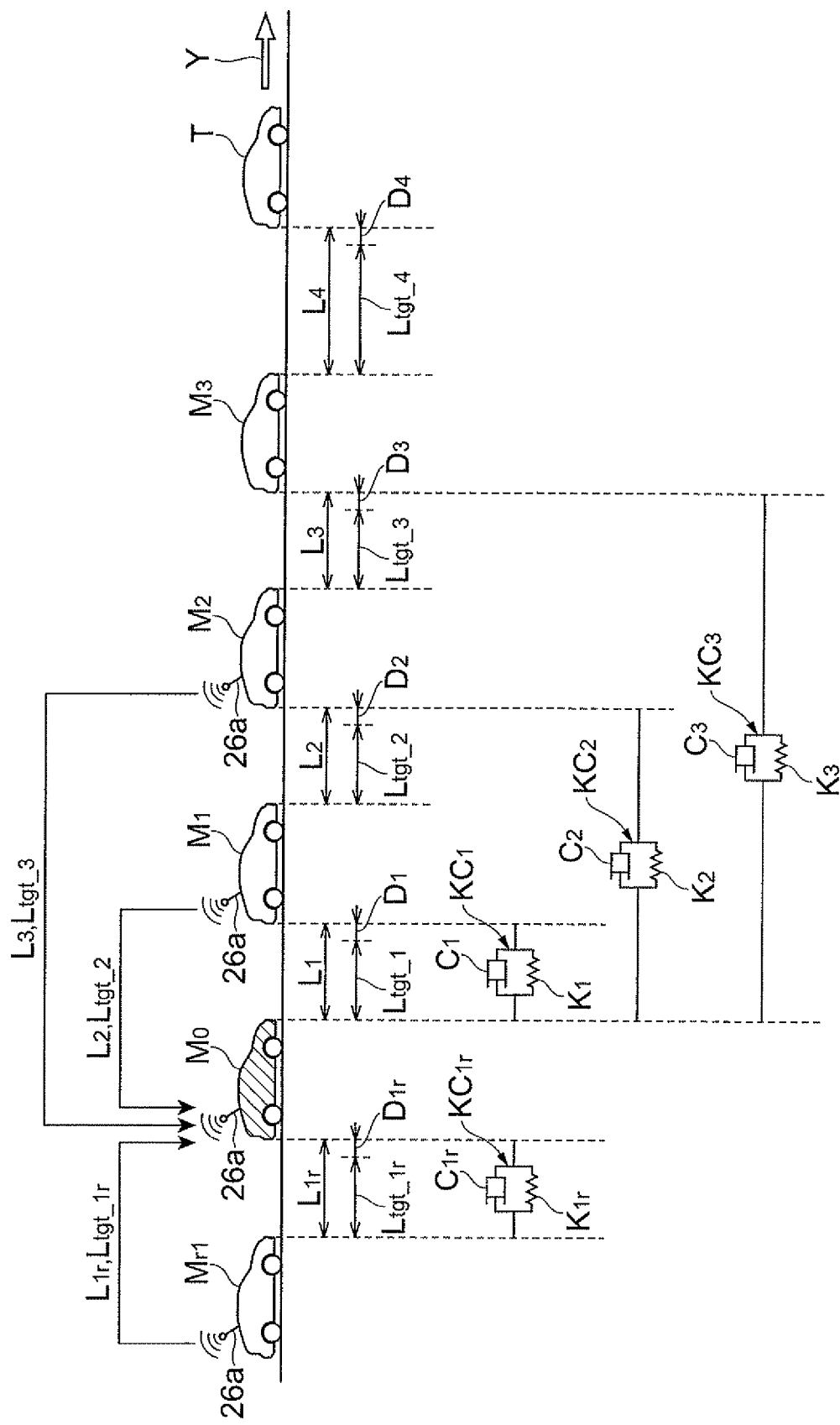
FIG. 6 is a diagram illustrating run control carried out by the follow-up run control device according to the third embodiment.

As shown in FIG. 6, the peripheral vehicle $M_{1r}$ running just behind the vehicle $M_0$ is a communicating vehicle and controls the front inter-vehicle distance $L_{1r}$ while setting the target inter-vehicle distance $L_{tgt\_1r}$ and measuring the front inter-vehicle distance $L_{1r}$ by the use of the front inter-vehicle distance sensor. The peripheral vehicle $M_{1r}$ calculates the relative speed $dL_{1r}/dt$ of the vehicle $M_0$ as a temporal differentiation of the front inter-vehicle distance $L_{1r}$. The peripheral vehicle $M_{1r}$ can transmit the target inter-vehicle distance $L_{tgt\_1r}$, the front inter-vehicle distance $L_{1r}$, and the relative speed $dL_{1r}/dt$ (relative speed $D_{1r}'$) to the vehicle $M_0$ by the inter-vehicle communication.

Figure 7:
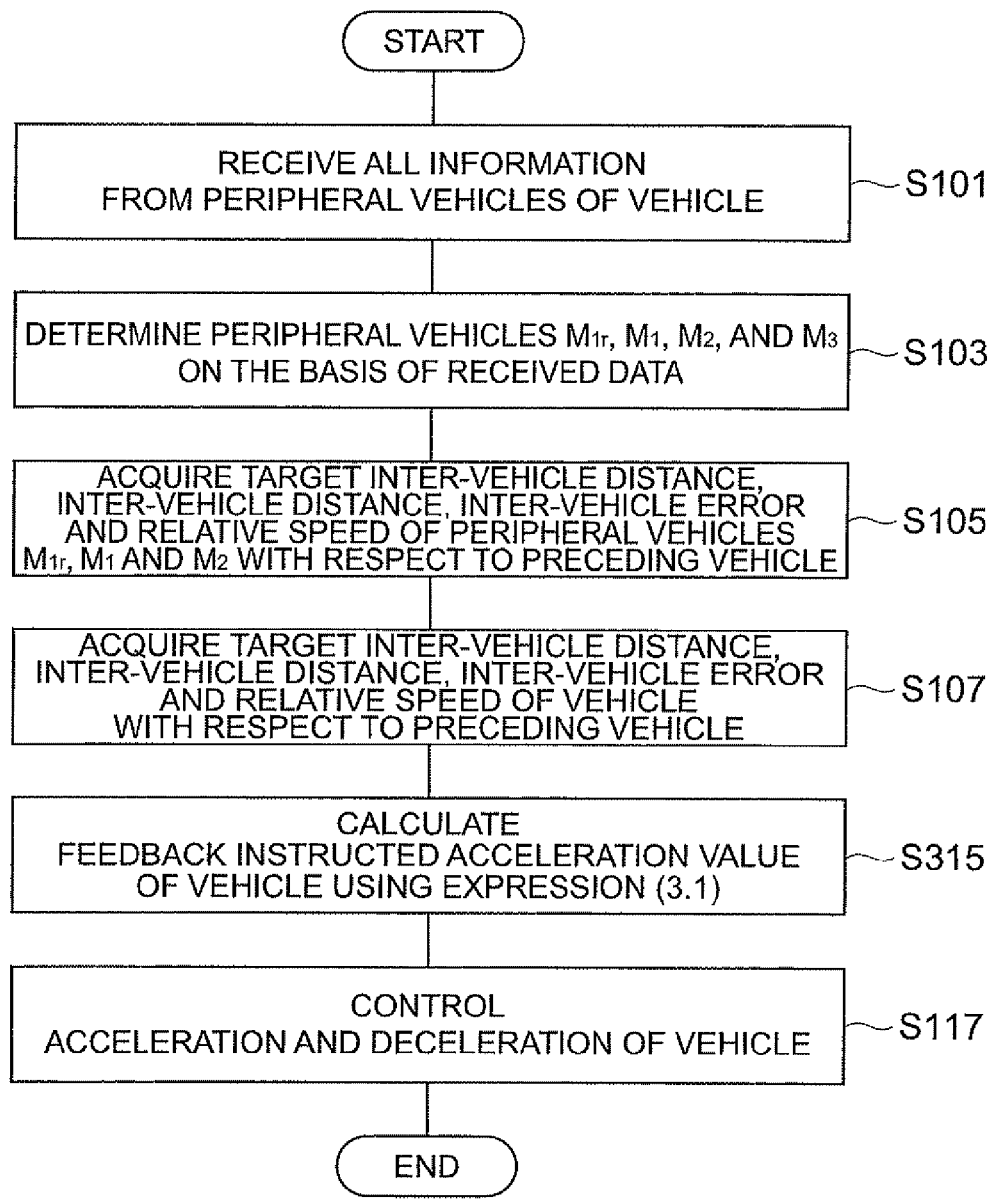
FIG. 7 is a flowchart illustrating the run control carried out by the follow-up run control device according to the third embodiment.

An example of the follow-up run control of the vehicle $M_0$ carried out by the follow-up run control device 301 will be described below with reference to FIGS. 6 and 7. In the flowchart of FIG. 7, the processes equal or equivalent to the processes shown in FIG. 3 are referenced by like reference signs and the repeated description thereof is not made.

First, the vehicle control ECU 10 determines the vehicles $M_{1r}$, $M_1$, $M_2$, and $M_3$ as the peripheral vehicles through the processes of steps S101 and S103. Thereafter, the vehicle control ECU 10 acquires the target inter-vehicle distances $L_{tgt\_1r}$, $L_{tgt\_2}$, and $L_{tgt\_3}$, the front inter-vehicle distances $L_{1r}$, $L_2$, and $L_3$, and the relative speeds $dL_1/dt$, $dL_2/dt$, and $dL_3/dt$ by the inter-vehicle communications with the peripheral vehicles $M_{1r}$, $M_1$, and $M_2$ and acquires the inter-vehicle errors $D_{1r}$, $D_2$, and $D_3$ and the relative speeds $D_{1r}'$, $D_2'$, and $D_3'$ by calculations (S105). The vehicle control ECU 10 acquires the inter-vehicle error $D_1$ and the relative speed $D_1'$ in the vehicle $M_0$ (S107). The vehicle control ECU 10 acquires the inter-vehicle errors $D_{1r}$, $D_1$, $D_2$, and $D_3$ and the relative speeds $D_{1r}'$, $D_1'$, $D_2'$, and $D_3'$ through the processes of steps S105 and S107.

Then, the vehicle control ECU 10 calculates the feedback instructed acceleration value $u_{fb}$ of the vehicle $M_0$ using Expression (3.1) (S315).

$$u_{fb} = k_1 D_1 + c_1 D_1' + \qquad \text{Expression (3.1)}$$
$$k_2(D_1 + D_2)c_2(D_1' + D_2') + k_3(D_1 + D_2 + D_3) +$$
$$c_3(D_1' + D_2' + D_3') - (k_{1r} D_{1r} + c_{1r} D_{1r}')$$

Thereafter, the calculated feedback instructed acceleration value $u_{fb}$ is transmitted to the engine control ECU 31 and the brake control ECU 32 (S117).

Expression (3.1) is obtained by adding the term $-(k_{1r}D_{1r} + c_{1r}D_{1r}')$ to Expression (1.1). This term means the influence of the spring damper unit $KC_{1r}$ shown in FIG. 6. Therefore, according to the follow-up run control device 301, it is possible to carry out the follow-up run in consideration of the movement of the following peripheral vehicle $M_{1r}$ in addition to the movements of the peripheral vehicles $M_1$, $M_2$, and $M_3$ considered by the follow-up run control device 1. By considering the movement the following vehicle in this way, it is possible to safely drive the vehicle $M_0$ in consideration of the rear inter-vehicle distance even when a following vehicle follows the vehicle $M_0$ with a small inter-vehicle distance.

When the peripheral vehicle $M_{1r}$ is a non-communicating vehicle, the information from the peripheral vehicle $M_{1r}$ cannot be acquired by the inter-vehicle communication, but the inter-vehicle error $D_{1r}$ and the relative speed $D_{1r}'$ can be acquired by the following method, whereby the follow-up run control device 301 can carry out the follow-up run control. That is, in this case, the vehicle control ECU 10 of the vehicle $M_0$ sets the target inter-vehicle distance $L_{tgt\_1r}$ as a target of the rear inter-vehicle distance and acquires the actual rear inter-vehicle distance $L_{1r}$ by the use of the rear inter-vehicle distance sensor 22a. The vehicle control ECU calculates the inter-vehicle error $D_{1r}$ from the difference between the target inter-vehicle distance $L_{tgt\_1r}$ and the rear inter-vehicle distance $L_{1r}$. The vehicle control ECU 10 calculates the relative speed $dL_{1r}/dt$ (relative speed $D_{1r}'$) to the peripheral vehicle $M_1$ as a temporal differentiation of the rear inter-vehicle distance $L_{1r}$.

Fourth Embodiment

The follow-up run control device according to the fourth embodiment of the invention will be described. The physical configuration of the follow-up run control device 401 according to this embodiment mounted on the vehicle $M_0$ is the same as the follow-up run control device 1 as shown in FIG. 1 and thus repeated description thereof is not made.

Figure 8:
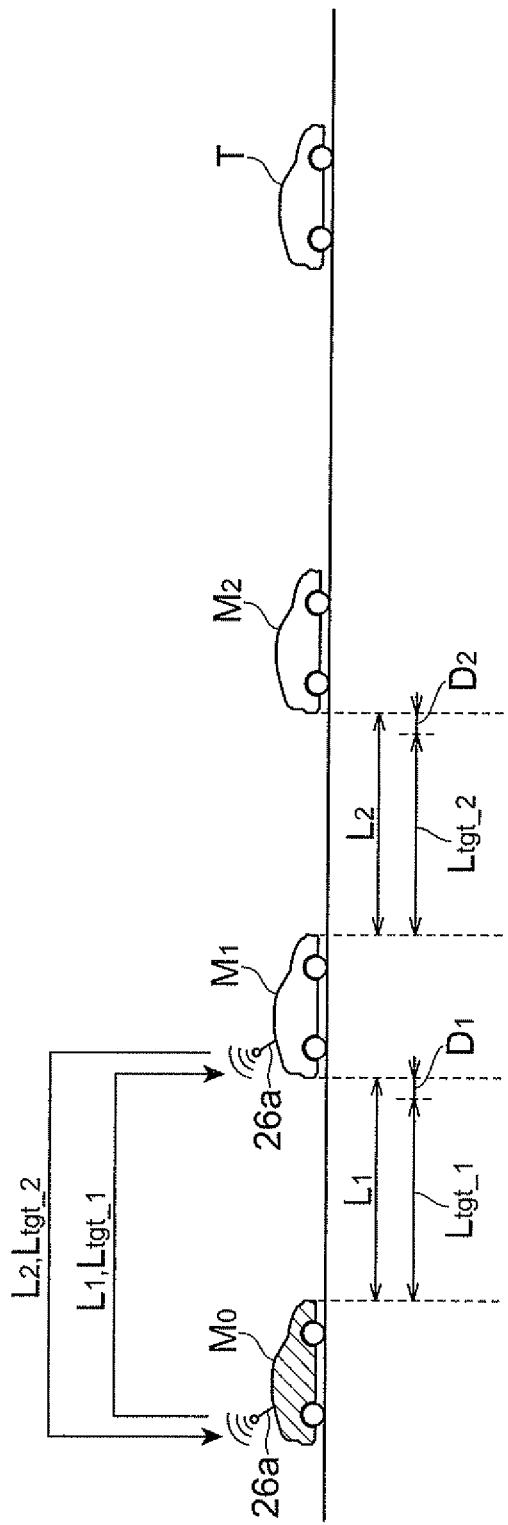
FIG. 8 is a diagram illustrating run control carried out by the follow-up run control device according to the fourth embodiment.
Figure 9:
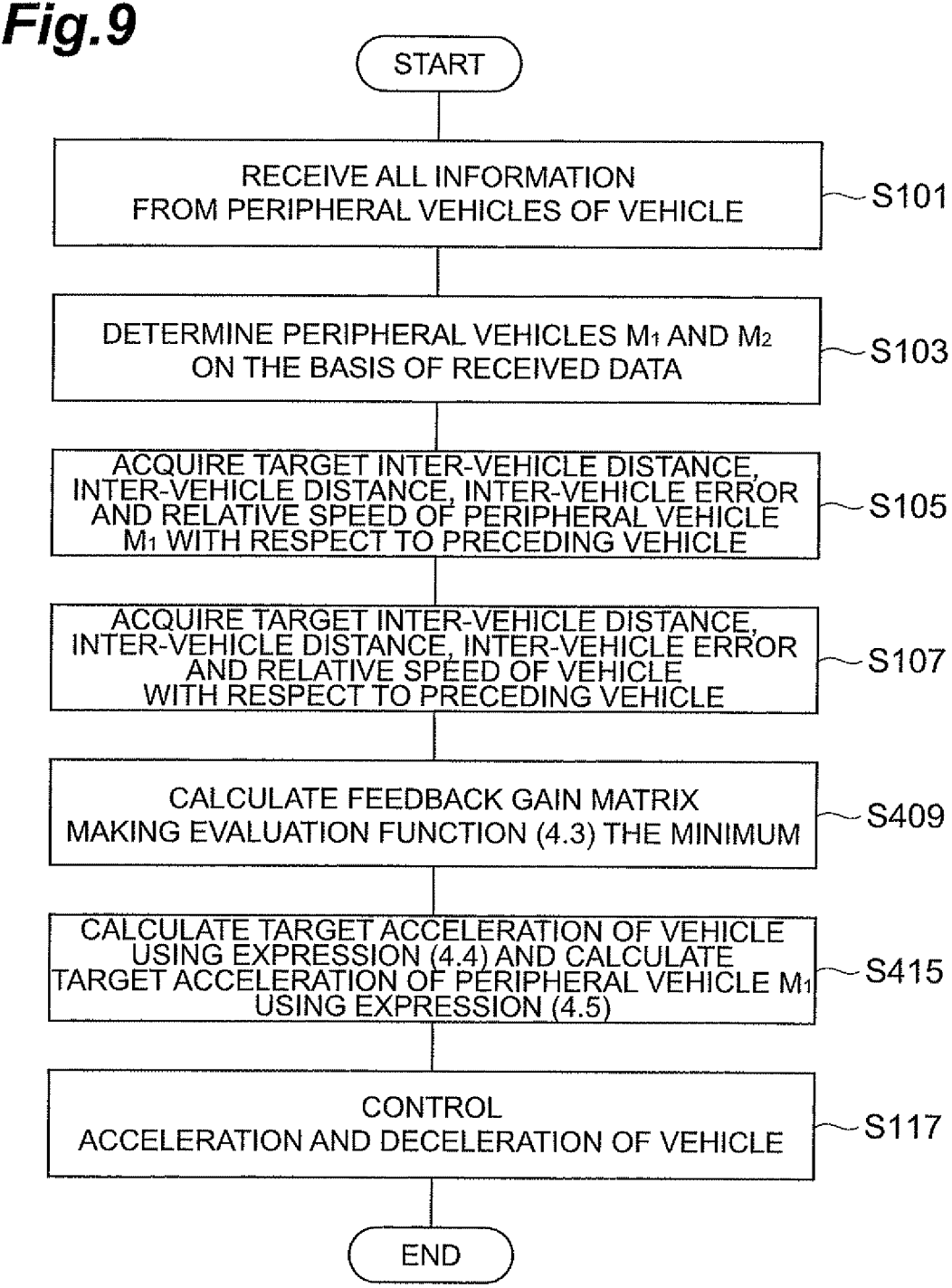
FIG. 9 is a flowchart illustrating the run control carried out by the follow-up run control device according to the fourth embodiment.

An example of the follow-up run control of the vehicle $M_0$ carried out by the follow-up run control device 401 will be described below with reference to FIGS. 8 and 9. In the flowchart of FIG. 9, the processes equal or equivalent to the processes shown in FIG. 3 are referenced by like reference signs and the repeated description thereof is not made. As shown in FIG. 8, the peripheral vehicle $M_1$ is a communicating vehicle and the peripheral vehicle $M_2$ is a non-communicating vehicle.

First, the vehicle control ECU 10 determines the vehicles $M_1$ and $M_2$ as the peripheral vehicles through the processes of steps S101 and S103. Thereafter, the vehicle control ECU 10 acquires the target inter-vehicle distance $L_{tgt\_2}$ between the peripheral vehicle $M_1$ and the peripheral vehicle $M_2$, the front inter-vehicle distance $L_2$, and the relative speed $dL_2/dt$, by the inter-vehicle communications with the peripheral vehicle $M_1$ and acquires the inter-vehicle error $D_2$ and the relative speed $D_2'$ by calculations (S105). The vehicle control ECU 10 acquires the inter-vehicle error $D_1$ and the relative speed $D_1'$ in the vehicle $M_0$ (S107). The vehicle control ECU 10 acquires the inter-vehicle errors $D_1$ and $D_2$ and the relative speeds $D_1'$ and $D_2'$ through the processes of steps S105 and S107.

Then, the vehicle control ECU 10 expresses the running states of the vehicle $M_0$ and the peripheral vehicle $M_1$ by the use of Expression (4.1) as a state space equation, where the acceleration $a_1$ of the peripheral vehicle $M_1$ and the acceleration $a_0$ of the vehicle $M_0$ are control inputs and the inter-vehicle errors $D_1$ and $D_2$ and the relative speeds $D_1'$ and $D_2'$ are state amounts, and applies the optimal control (LQ control) to the system expressed by Expression (4.1) as the state space equation.

Expression (4.1)

$$\frac{d}{dt}X = \frac{d}{dt}\begin{bmatrix} D_1 \\ D_1' \\ D_2 \\ D_2' \end{bmatrix} \qquad (4.1)$$

$$= \begin{bmatrix} 0 & 1 & 0 & 0 \\ 0 & 0 & 0 & 0 \\ 0 & 0 & 0 & 1 \\ 0 & 0 & 0 & 0 \end{bmatrix}\begin{bmatrix} D_1 \\ D_1' \\ D_2 \\ D_2' \end{bmatrix} + \begin{bmatrix} 0 & 0 \\ 1 & -1 \\ 0 & 0 \\ -1 & 0 \end{bmatrix}\begin{bmatrix} a_1 & a_0 \end{bmatrix} + \begin{bmatrix} 0 \\ 0 \\ 0 \\ 1 \end{bmatrix} a_2$$

$$= Ax + Bu + Hw$$

Here, $a_2$ in Expression (4.1) represents the acceleration of the peripheral vehicle $M_2$, which is treated as a disturbance in this system. Expression (4.2) is established.

Expression (4.2)

$$u_{fb} = Kx \qquad (4.2)$$

Here, K represents a feedback gain matrix, which is a 4×2 matrix. Since the vehicle control ECU 10 carries out the optimal control (LQ control) of the system expressed by Expression (4.1) as the state space equation, the feedback gain matrix K which minimize an evaluation function J expressed by Expression (4.3) is uniquely acquired (S409).

Expression (4.3)

$$J = \int \left\{ \varepsilon_L (D_1^2 + D_2^2) + \varepsilon_{dL}\left(\frac{dD_1^2}{dt} + \frac{dD_2^2}{dt}\right) + \varepsilon_u(a_0^2 + a_1^2) \right\} dt \quad (4.3)$$

Weights $\varepsilon_L$, $\varepsilon_{dL}$, and $\varepsilon_u$ are set in the term associated with the inter-vehicle errors $D_1$ and $D_2$, the term associated with the relative speeds $D_1'$ and $D_2'$, and the term associated with the instructed acceleration values $a_0$ and $a_1$ In Expression (4.3) That is, by distributing the weights $\varepsilon_L$, $\varepsilon_{dL}$, and $\varepsilon_u$ included in the evaluation function J, the balance of importance level is determined in an array run control including three factors of the stability in inter-vehicle distance, the decrease in relative speed, and the decrease in acceleration and deceleration of the vehicle (energy save of the acceleration and deceleration). Therefore, it is possible to carry out the array run control in which the three factors are weighted at the desired distribution ratios by adjusting the weights $\varepsilon_L$, $\varepsilon_{dL}$, and $\varepsilon_u$. The values of the weights $\varepsilon_L$, $\varepsilon_{dL}$, and $\varepsilon_u$ are determined in advance on the basis of a design idea desired by a designer of the follow-up run control device 1 and stored in advance in the information storage unit 10a of the vehicle control ECU 10.

The acceleration $a_1$ of the peripheral vehicle $M_1$ and the acceleration $a_0$ of the vehicle $M_0$ are determined as follows using Expressions (4.4) and (4.5) and the feedback gain matrix K which minimize the evaluation function J (S415).

Expressions (4.4) and (4.5)

$$a_1 = \left(k_{11} \cdot D_1 + k_{12} \cdot \frac{dD_1}{dt} + k_{13} \cdot D_2 + k_{14} \cdot \frac{dD_2}{dt}\right) \quad (4.4)$$

$$a_0 = \left(k_{01} \cdot D_1 + k_{02} \cdot \frac{dD_1}{dt} + k_{03} \cdot D_2 + k_{04} \cdot \frac{dD_2}{dt}\right) \quad (4.5)$$

In Expressions (4.4) and (4.5), 4×2 elements included in the feedback gain matrix K which minimize the evaluation function J are represented by attaching a subscript to "k". The vehicle control ECU 10 transmits the determined acceleration $a_0$ as a target acceleration to the engine control ECU 31 and the brake control ECU 32 (S117). The vehicle control ECU 10 may transmit the determined acceleration $a_1$ to the peripheral vehicle $M_1$ by the inter-vehicle communication.

The peripheral vehicle $M_1$ may acquire the target acceleration $a_1$ from the vehicle $M_0$ by the inter-vehicle communication. Alternatively, the peripheral vehicle $M_1$ may acquire the target acceleration $a_1$ by receiving information such as the inter-vehicle distance $L_1$ and the target inter-vehicle distance $L_{tgt\_1}$ from the vehicle by the inter-vehicle communication and performing the same calculation as the vehicle $M_0$. The peripheral vehicle $M_1$ increases or decreases its speed on the basis of the acquired target acceleration $a_1$.

According to this follow-up run control device 401, the vehicle $M_0$ can carry out the follow-up running in consideration of the movements of two peripheral vehicles $M_1$ and $M_2$ existing around the vehicle. Since the optimal combination of the accelerations $a_0$ and $a_1$ is derived by the optimal control (LQ control) and the vehicle $M_0$ and the peripheral vehicle $M_1$ move in cooperation with each other to stabilize the inter-vehicle distances $L_1$ and $L_2$, it is possible to carry out the smooth and pleasant follow-up run and to stabilize the traffic flow.

Fifth Embodiment

The follow-up run control device according to the fifth embodiment of the invention will be described. The physical configuration of the follow-up run control device 501 according to this embodiment mounted on the vehicle $M_0$ is the same as the follow-up run control device 1 as shown in FIG. 1 and thus repeated description thereof is not made.

Figure 10:
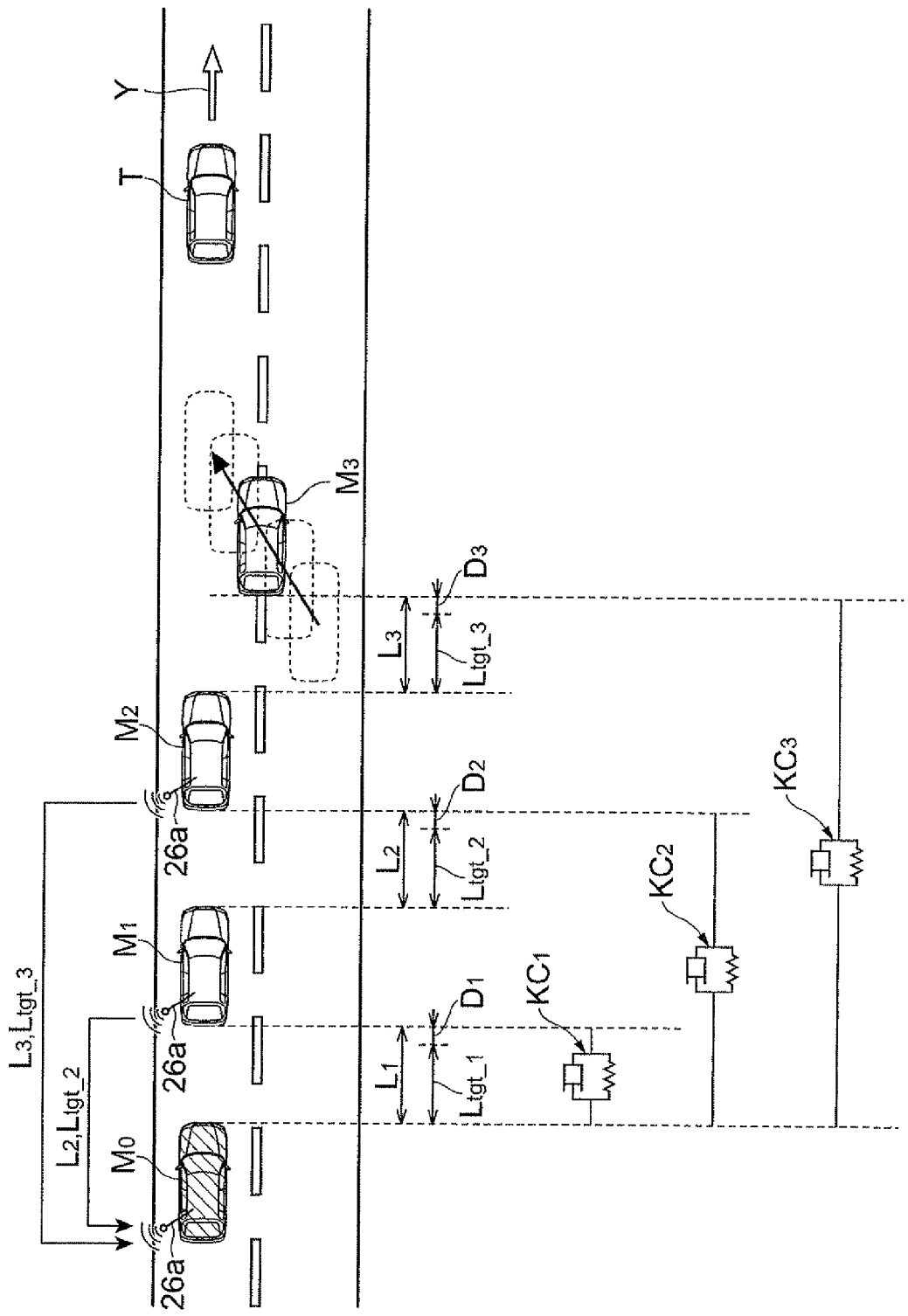
FIG. 10 is a diagram illustrating run control carried out by the follow-up run control device according to the fifth embodiment.

As shown in FIG. 10, the peripheral vehicles $M_1$ and $M_2$ before the vehicle $M_0$ are communicating vehicles and the peripheral vehicle $M_3$ is a non-communicating vehicle. The peripheral vehicle $M_3$ is running in the right lane of the lane of the vehicle $M_0$, and will slowly cut in the lane of the vehicle $M_0$ by the lane change and run before the peripheral vehicle $M_2$.

In this case, when a vehicle running in a different lane and not being recognized as the peripheral vehicle is suddenly recognized as the front peripheral vehicle $M_3$ in the lane, a sudden feedback gain is applied to the run control of the vehicle $M_0$ to make the control discontinuous, which is not preferable. In a traffic flow in which various vehicles coexist, since another vehicle often cuts in or run out of the lane of the vehicle $M_0$, it is preferable to suppress the discontinuity in control in carrying out the follow-up run in consideration of the movements of plural peripheral vehicles.

Figure 11:
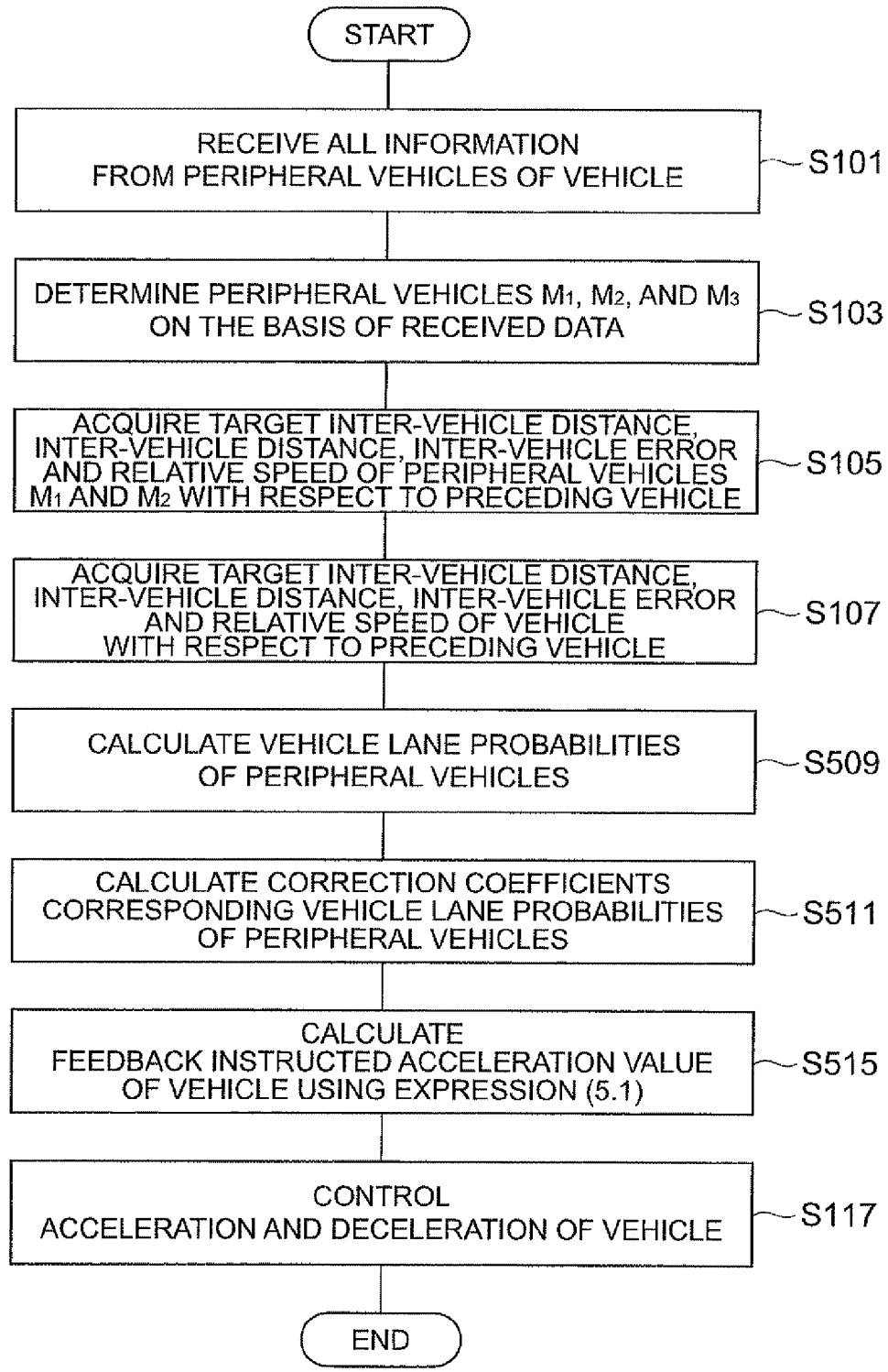
FIG. 11 is a flowchart illustrating the run control carried out by the follow-up run control device according to the fifth embodiment.

An example of the follow-up run control of the vehicle $M_0$ carried out by the follow-up run control device 501 to suppress the discontinuity in control will be described below with reference to FIGS. 10 and 11.

The following processes are processes carried out by the follow-up run control device 501 while the peripheral vehicle $M_3$ is changing its lane, as shown in FIG. 10. In the flowchart of FIG. 11, the processes equal or equivalent to the processes shown in FIG. 3 are referenced by like reference signs and the repeated description thereof is not made.

First, the vehicle control ECU 10 determines the vehicles $M_1$, $M_2$, and $M_3$ as the peripheral vehicles through the processes of steps S101 and S103. Thereafter, the vehicle control ECU 10 acquires the target inter-vehicle distances $L_{tgt\_2}$ and $L_{tgt\_3}$, the front inter-vehicle distances $L_2$ and $L_3$, and the relative speeds $dL_2/dt$ and $dL_3/dt$ by the inter-vehicle communications with the peripheral vehicles $M_1$ and $M_2$ and acquires the inter-vehicle errors $D_2$ and $D_3$ and the relative speed $D_2'$ and $D_3'$ by calculations (S105). The vehicle control ECU 10 acquires the inter-vehicle error $D_1$ and the relative speed $D_1'$ in the vehicle $M_0$ (S107). The vehicle control ECU 10 acquires the inter-vehicle errors $D_1$, $D_2$, and $D_3$ and the relative speeds $D_1'$, $D_2'$, and $D_3'$ through the processes of steps S105 and S107.

Then, the vehicle control ECU 10 calculates the vehicle lane probability $P_1$ of the peripheral vehicle $M_1$, the vehicle lane probability $P_2$ of the peripheral vehicle $M_2$, and the vehicle lane probability $P_3$ of the peripheral vehicle $M_3$ (S509). That is, the vehicle control ECU 10 serves as the vehicle lane probability acquiring means. The vehicle lane probability is an indicator representing an accuracy that a peripheral vehicle exists in the same lane as the vehicle $M_0$ and, in other words, is the probability with which it can be said that "the peripheral vehicle is a vehicle running in the same lane as the vehicle $M_0$". The vehicle lane probability has a value in the range of 0% to 100%, increases as the position of a peripheral vehicle becomes closer to the front side of the vehicle $M_0$, and decreases as the position of a peripheral vehicle becomes farther from the front side of the vehicle $M_n$. In this example, since the peripheral vehicles $M_1$ and $M_2$ are running in front of the vehicle $M_0$, the vehicle lane probabilities $P_1$ and $P_2$ are 100% and constant. Since the peripheral vehicle $M_3$ slowly becomes closer to the front side of the vehicle $M_0$, the vehicle lane probability $P_3$ of the peripheral vehicle $M_3$ slowly increases.

In order to calculate the vehicle lane probability of a peripheral vehicle, it is necessary to sense the lateral position (the position in the direction perpendicular to the lane) of the peripheral vehicle. Therefore, the follow-up run control device 501 may include, for example, a millimeter-wave radar disposed in the front or rear portion of the vehicle $M_0$ as the lateral position sensing means of the peripheral vehicle. For example, the lateral position of the peripheral vehicle may be sensed using the millimeter-wave radar disposed in the front inter-vehicle distance sensor 21a or the rear inter-vehicle distance sensor 22a. The peripheral vehicles $M_1$ and $M_2$ may sense the lateral positions of the peripheral vehicles $M_2$ and $M_3$ in front thereof, respectively, and may transmit the sensed position information to the vehicle $M_0$ by the inter-vehicle communication.

Figure 12:
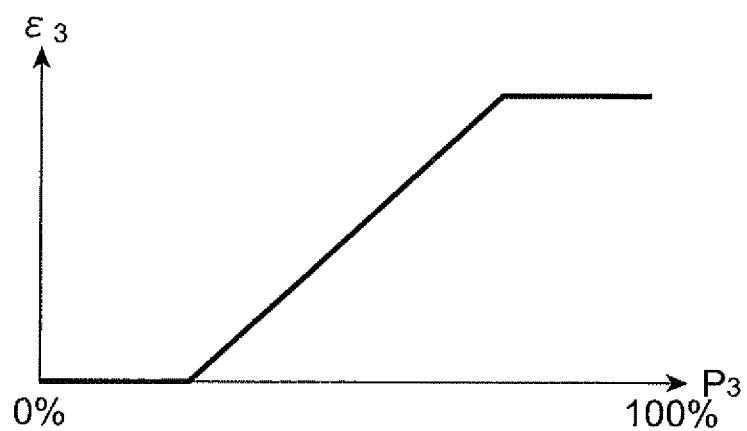
FIG. 12 is a graph illustrating an example of a relation between a vehicle lane probability and a correction coefficient, which are used in the follow-up run control device according to the fifth embodiment.

The vehicle control ECU 10 derives correction coefficients $\epsilon_1$, $\epsilon_2$, and $\epsilon_3$ corresponding to the calculated vehicle lane probabilities $P_1$, $P_2$, and $P_3$ (S511). The correction coefficients $\epsilon_1$, $\epsilon_2$, and $\epsilon_3$ are coefficients which are used to calculate the feedback instructed acceleration value $u_{fb}$ and to adjust the weight of the influence of the peripheral vehicles $M_1$, $M_2$, and $M_3$ on the feedback instructed acceleration value $u_{fb}$. As shown in FIG. 12, the correction coefficients $\epsilon_1$, $\epsilon_2$, and $\epsilon_3$ are correlated with the vehicle lane probabilities $P_1$, $P_2$, and $P_3$ in advance, and the correction coefficients $\epsilon_1$, $\epsilon_2$, and $\epsilon_3$ increase as the vehicle lane probabilities $P_1$, $P_2$, and $P_3$. In this example, the correction coefficients $\epsilon_1$ and $\epsilon_2$ are constant and the correction coefficient $\epsilon_3$ slowly increases with the progress of the lane change of the peripheral vehicle $M_3$.

The vehicle control ECU 10 calculates the feedback instructed acceleration value $u_{fb}$ of the vehicle $M_0$ using Expression (5.1) (S515).

$$u_{fb} = \varepsilon_1\{k_1 D_1 + c_1 D_1'\} + \varepsilon_2\{k_2(D_1 + D_2) + c_2(D_1' + D_2')\} + \varepsilon_3\{k_3(D_1 + D_2 + D_3) + c_3(D_1' + D_2' + D_3')\} \quad \text{Expression (5.1)}$$

Thereafter, the calculated feedback instructed acceleration value $u_{fb}$ is transmitted to the engine control ECU 31 and the brake control ECU 32 (S117).

Expression (5.1) is obtained by adding the correction coefficients $\epsilon_1$, $\epsilon_2$, and $\epsilon_3$ to Expression (1.1). The correction coefficients $\epsilon_1$, $\epsilon_2$, and $\epsilon_3$ mean the magnitudes of the influences of the spring damper units $KC_1$, $KC_2$, and $KC_3$ shown in FIG. 10. Particularly, in this example, as the peripheral vehicle $M_3$ slowly becomes closer to the front side of the vehicle $M_0$, the correction coefficient $\epsilon_3$ increases slowly and continuously, which means that the influence of the spring damper unit $KC_3$ increases slowly and continuously. Therefore, according to the follow-up run control device 501, even when the peripheral vehicle $M_3$ slowly cuts in the lane of the vehicle $M_0$, it is possible to suppress the discontinuity in run control of the vehicle $M_0$ by slowly adding the influence of the movement of the peripheral vehicle $M_3$. Expression (5.1) includes $\epsilon_1$ and $\epsilon_2$ associated with the vehicle lane probabilities of the peripheral vehicle $M_1$ and the peripheral vehicle $M_2$. Accordingly, even when the peripheral vehicle $M_1$ and the peripheral vehicle $M_2$ change the lanes, it is possible to suppress the discontinuity in run control of the vehicle $M_0$ by the same effect.

INDUSTRIAL APPLICABILITY

The invention relates to a follow-up run control device controlling a running state of a vehicle in a state where peripheral vehicles running before or behind the vehicle exist and implements the follow-up run in consideration of movements of plural vehicles around the vehicle.

The invention claimed is:

1. A follow-up run control device controlling a running state of a vehicle in a state where peripheral vehicles running before or behind the vehicle exist, comprising:
   determination means for determining the peripheral vehicles having an influence on a run control of the vehicle,
      wherein the peripheral vehicles performing inter-vehicle communication with the vehicle are communicating peripheral vehicles, and
      wherein at least one of the peripheral vehicles running in a forefront among the communicating peripheral vehicles in a same lane has an influence on a run control of the vehicle;
   deviation acquiring means for acquiring information regarding a deviation between a relative positional relation and a target relative positional relation of the vehicle and the peripheral vehicles with respect to preceding vehicles running just before; and
   follow-up control amount calculating means for calculating a follow-up control amount of the vehicle to control the running state of the vehicle on the basis of the information regarding the deviations of a plurality of vehicles acquired by the deviation acquiring means,
   wherein when m (where m=2, 3, . . . ) peripheral vehicles exist, the follow-up control amount u of the vehicle calculated by the follow-up control amount calculating means is expressed by the following expression, $$u = k_1 D_1 + c_1 D_1' + k_2(D_1 + D_2) + c_2(D_1' + D_2') + \ldots + k_m(D_1 + D_2 + \ldots + D_m) + c_m(D_1' + D_2' + \ldots + D_m')$$

where $D_1$ represents the deviation between the relative positional relation and the target relative positional relation of the vehicle with respect to the preceding vehicle thereof, $D_1'$ represents the temporal differentiation of the deviation $D_1$, $D_n$ represents the deviation between the relative positional relation and the target relative positional relation of the (n−1)-th peripheral vehicle before the vehicle with respect to the preceding vehicle thereof, $D_n'$ represents the temporal differentiation of the deviation $D_n$, and $k_1$ to $k_m$ and $c_1$ to $c_m$ are constants.

2. The follow-up run control device according to claim 1, wherein the deviation acquiring means acquires the information regarding the deviations of the communicating peripheral vehicles by inter-vehicle communications with the corresponding communicating peripheral vehicles, and
   wherein the follow-up control amount calculating means calculates the follow-up control amount of the vehicle and the follow-up control amounts of the communicating peripheral vehicles on the basis of the information regarding the deviations of a plurality of vehicles acquired by the deviation acquiring means.

3. The follow-up run control device according to claim 1, further comprising vehicle lane probability acquiring means for acquiring a vehicle lane probability representing accuracy likelihood that one peripheral vehicle exists in the same lane as the vehicle,
    wherein the follow-up control amount calculating means calculates the follow-up control amount of the vehicle additionally on the basis of the vehicle lane probabilities of the peripheral vehicles.

4. The follow-up run control device according to claim 2, further comprising vehicle lane probability acquiring means for acquiring a vehicle lane probability representing accuracy likelihood that one peripheral vehicle exists in the same lane as the vehicle,
    wherein the follow-up control amount calculating means calculates the follow-up control amount of the vehicle additionally on the basis of the vehicle lane probabilities of the peripheral vehicles.

\* \* \* \* \*